(12) United States Patent
Chen

(10) Patent No.: US 7,457,919 B2
(45) Date of Patent: Nov. 25, 2008

(54) METHOD FOR MEMORY PAGE MANAGEMENT

(75) Inventor: Min-Jung Chen, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 162 days.

(21) Appl. No.: 11/309,128

(22) Filed: Jun. 26, 2006

(65) Prior Publication Data

US 2007/0260824 A1 Nov. 8, 2007

(30) Foreign Application Priority Data

May 2, 2006 (TW) .............................. 95115551 A

(51) Int. Cl.
*G06F 12/12* (2006.01)
(52) U.S. Cl. ..................................................... 711/133
(58) Field of Classification Search ................. 711/133, 711/136
See application file for complete search history.

(56) References Cited

U.S. PATENT DOCUMENTS 6,701,393 B1 * 3/2004 Kemeny et al. ................ 710/40
2003/0088739 A1 * 5/2003 Wilkes et al. ............... 711/133

* cited by examiner

*Primary Examiner*—Kevin L Ellis
(74) *Attorney, Agent, or Firm*—Jianq Chyun IP Office

(57) ABSTRACT

A method for memory page management, suitable for managing data stored in several memory blocks is disclosed, which includes the following steps. First, multiple pages is recorded in a first register. When a request for reading data is received, whether the data is stored in those memory blocks is determined. If the data has already been stored in the memory blocks, the corresponding page is found out. Otherwise, the last page of the first register is taken as the page for storing the data and the data is accessed from an external storage device and then stored in the memory block corresponding to the page. Finally, the data read from the memory block corresponding to the page is output.

10 Claims, 4 Drawing Sheets

METHOD FOR MEMORY PAGE MANAGEMENT

CROSS-REFERENCE TO RELATED APPLICATION

This application claims the priority benefit of Taiwan application serial no. 95115551, filed on May 2, 2006. All disclosure of the Taiwan application is incorporated herein by reference.

BACKGROUND OF THE INVENTION

1. Field of Invention

The present invention relates to a method for memory management, and more particularly to a method for memory management, wherein pages are recorded through shifting bits in the register.

2. Description of Related Art

Generally, when a computer is executing a program, the program code is first loaded in a memory, and then read and calculated by a computer microprocessor, after that, the result is obtained. Although the memory provides a relatively high accessing speed, it is rather expensive, such that the memory capacity for a common computer is limited. However, the memory required by the computer when executing programs always exceeds the physical memory capacity, thus, the concept of Virtual Memory is derived, which refers to dividing a block from the hard disk to be used as the memory so as to solve the problem of insufficient memory space.

Currently, the virtual memory management architecture adopts the method of page management. The address spaces of the virtual memory and the physical memory are divided into a plurality of pages, and then, through the page management, a part of the data required during the current execution of the application is stored in the pages of the physical memory, and other parts of the data are stored in the pages of the virtual memory. According to the requirement for executing programs by the microprocessor, the data stored in the pages of the virtual memory is flexibly loaded into the physical memory for being used by the microprocessor. With the above method, the system is able to execute programs within a limited memory space.

The conventional page management rule includes two methods, namely Least Recently Use (LRU) and First In First Out (FIFO). The LRU means that when performing the page replacement, the least recently used page in the memory block is replaced as a new page; and the FIFO means that the page that is accessed first is the one being taken out first and then replaced as a new page. Moreover, the so-called page management refers to dividing the register region into a plurality of pages, wherein each page corresponds to a memory block and each page is provided with a counter for counting the existing time of each page (i.e., the accumulated time after the data in the memory block corresponding to the page is accessed) for being used as the reference for page replacement.

Herein, the LRU page management rule is taken as an example. FIG. 1 is a flow chart of a conventional memory page management. Referring to FIG. 1, after a request for reading data is received form the microprocessor (Step S110), whether the data is stored in the memory block corresponding to each page is determined (Step S120). If the data is not stored in the memory block corresponding to the page, the page having the largest counting value is found out in the register (Step S130), and then, the required data is accessed from an external storage device and stored in the memory block corresponding to the page (Step S150). If the data has already been stored in the memory block corresponding to the page, the value of the counter of the page for storing the data is set to be 0, and the values of the counters of other pages are increased by 1 (Step S140). Finally, the data read from the memory block corresponding to the above page is output (Step S160).

In the above flow of the memory page management, if the data is not stored in the memory block corresponding to the page, the microprocessor must read all the pages in the physical memory and compare the counting values of the counters for the pages, so as to find out the page to be replaced. As for the above example, the register is divided into 8 pages, each page must be provided with an 8-bit counter, and during the paging process, 8 memory reading, 8 memory writing and 15 logic calculation (including 8 data comparisons and 7 data additions) are required. It can be known that the conventional method for additionally disposing a counter for recording the existing time of each page not only wastes the memory space, but also consumes lots of calculation resources of the microprocessor because the microprocessor has to access the value of the counter and perform logic calculations for many times.

SUMMARY OF THE INVENTION

In view of the above, an object of the present invention is to provide a method for memory page management, wherein a plurality of pages in the memory is recorded by a register, and the time sequence of the existing time for the pages is used as the reference for selecting the page to be replaced, thereby saving the memory space and accelerating the page replacement.

In order to achieve the above and other objects, the present invention provides a method for memory page management, which is suitable for managing data of a plurality of memory blocks in the memory. The method for memory page management comprises the following steps. First, a plurality of pages is recorded in a first register, wherein the pages are recorded in the first register according to the accessing sequence of the data in the memory block. Next, when a request for reading data is received, whether the data is stored in those memory blocks is determined. If the data has already been stored in the memory blocks, its corresponding page is found out. Otherwise, the last page of the first register is taken as the one for storing the data, and the data is accessed from an external storage device and then stored in the memory block corresponding to the page. Finally, the data read from the memory block corresponding to the page is output.

According to the method for memory page management in a preferred embodiment of the present invention, the pages are recorded by a plurality of bit groups in the first register, and each bit group comprises a plurality of bits.

According to the method for memory page management in the preferred embodiment of the present invention, the above step of finding out the corresponding page further comprises changing the corresponding page stored with data in the first register to the foremost page of the first register.

According to the method for memory page management in the preferred embodiment of the present invention, the step of changing the corresponding page stored with data in the first register to the foremost page of the first register comprises the following steps: first, the page is taken out. Next, other pages sorted in front of the page in the first register are moved backwards by one bit group. Finally, the page is recorded as the foremost page of the first register.

According to the method for memory page management in the preferred embodiment of the present invention, the above step of taking out the page comprises the following steps: first, a plurality of pages on a second register are recorded, and then the last page of the second register is recorded as a preset value and other pages are recorded as zero. Afterwards, a Logic AND calculation is performed for the pages in the first register and the pages in the second register, and then the result is recorded in the second register.

According to the method for memory page management in the preferred embodiment of the present invention, the step of recording the page as the foremost page of the first register comprises the following steps: first, the corresponding page stored with data in the second register is changed to the foremost page. Next, a logic OR calculation is performed for the pages in the first register and the pages in the second register. Finally, the calculation result is recoded in the first register.

According to the method for memory page management in the preferred embodiment of the present invention, the above step of taking out the last page of the first register as the one for storing the data and storing the data accessed from an external storage device in the memory block corresponding to the page further comprises changing the last page in the first register to the foremost page of the register.

According to the method for memory page management in the preferred embodiment of the present invention, the step of changing the last page of the first register to the foremost page of the register comprises the following steps: first, the page is taken out. Next, other pages sorted in front of the page in the first register are moved backwards by one bit group. Finally, the page as the foremost page of the first register is recorded.

According to the method for memory page management in the preferred embodiment of the present invention, the step of taking out the page comprises the following steps: first, a plurality of pages in the second register is recorded, and the last page of the second register is recorded as a preset value and other pages are recorded as zero. Then, performing a Logic AND calculation is performed for the plurality of pages in the first register and the plurality of pages in the second register, and then the result is recorded in the second register.

According to the method for memory page management in the preferred embodiment of the present invention, the step of recording the page as the foremost page of the first register comprises the following steps: first, the last page of the second register is changed to the foremost page. Then, a Logic OR calculation for the pages in the first register and the pages in the second register is performed. Finally, the calculation result is recorded in the first register.

According to the method for memory page management in the preferred embodiment of the present invention, when the number of the recorded pages exceeds the allowable number of pages stored in the first register, the method further comprises using at least a third register to record the pages.

In the present invention, the pages are recorded through dividing the register region into a plurality of bit groups, and by moving the bit groups, changing the sequence of existing time for a plurality of pages in the memory to function as the reference for replacing the pages. Therefore, the present invention can select and replace the pages only through reading/writing the memory once and through simple logic calculations, thereby saving the memory space and accelerating the page replacement.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
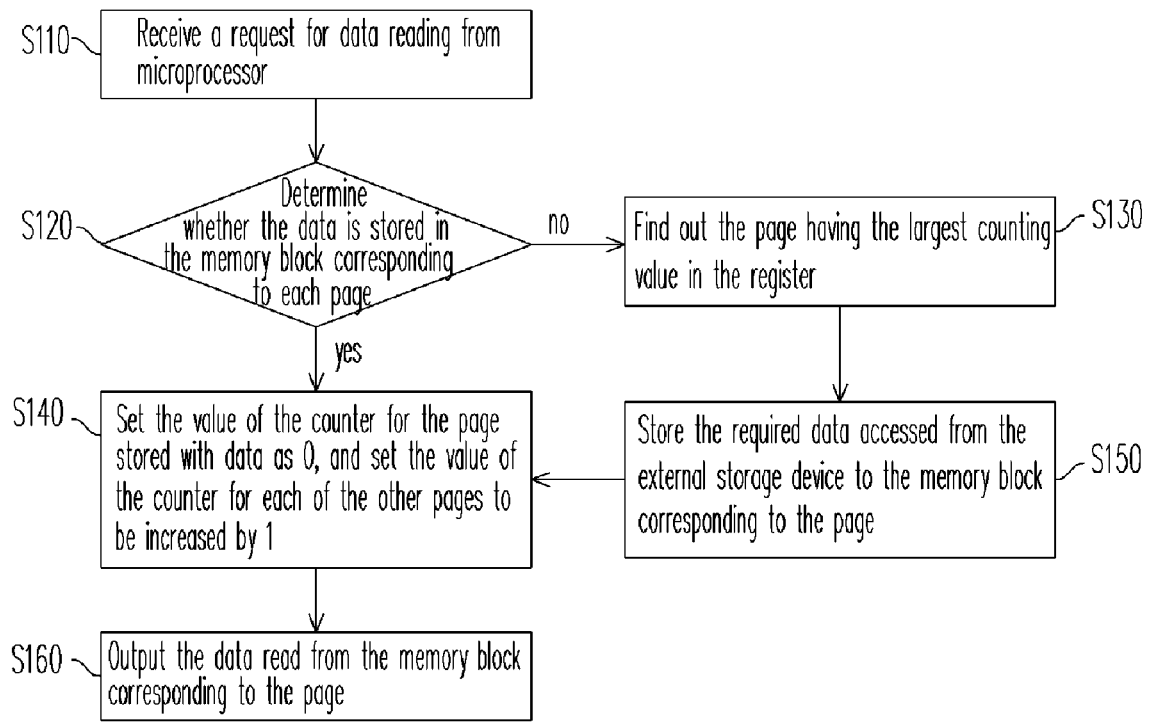
FIG. 1 is a flow chart of a conventional memory page management.
Figure 2:
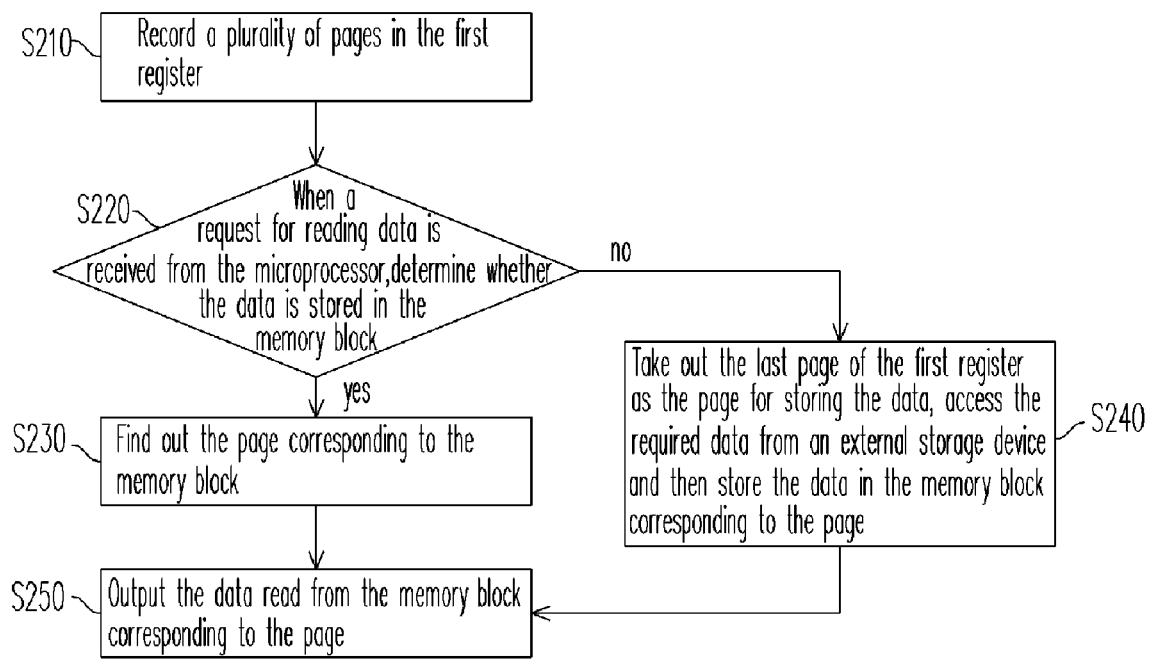
FIG. 2 is a flow chart of a method for memory page management according to the first embodiment of the present invention.

FIG. 2 is a flow chart of a method for memory page management according to a preferred embodiment of the present invention. Referring to FIG. 2, a method for memory page management suitable for managing data in a plurality of memory blocks of a memory is described in this embodiment, which comprises the following steps. First, a plurality of pages is recorded in a first register (Step S210), wherein the pages are recorded in the first register according to the accessing sequence of the data in the memory blocks, that is, the page numbers of the pages for the memory blocks are recorded in the first register according to the accessing sequence of the data in the memory blocks. The pages are recorded by a plurality of bit groups in the first register, and each of the bit groups includes a plurality of bits. In order to conveniently illustrate this embodiment, the pages below represent the numbers of pages corresponding to the memory blocks, for example, the 6th page indicates that the page number is 6.

Next, when a request for reading data is received from a microprocessor, whether the data is stored in the memory block is determined (Step S220). If the data is found out in the memory block, the corresponding page of this memory block is found out (Step S230). Each page in the first register corresponds to a memory block, and the data is stored in the memory blocks. When the data stored in the memory block is accessed, the position of the page corresponding to the memory block in the first register is correspondingly changed.

If the data cannot be found out in this memory block, it indicates that the data is still stored in an external storage device. At this time, the last page of the first register is taken as the one for storing the data, and the data accessed from the external storage device is stored in the memory block corresponding to the page (Step S240). Since the LRU paging rule is used in this embodiment, the least used page must be replaced. The memory block corresponding to the last page of the first register is the least accessed memory block, thus the last page is replaced, and the required data is loaded in the memory block corresponding to this page. Finally, the data read from the memory block corresponding to the page is output (Step S250), thus finishing the operation of page replacement.

In the above Step 230, besides finding out the corresponding page in the first register, it also needs to change the page as the foremost page of the first register, such that the memory block corresponding to the foremost page of the first register is the most recently accessed memory block. Therefore, if the required data is found out in the memory block, the order of the corresponding pages in the first register must be changed.

The step of changing the corresponding page stored with data in the first register to the foremost page of the first register comprises the following steps. First, the corresponding page stored with data is taken out, wherein a second register is used to record a plurality of pages, wherein the corresponding page stored with data in the second register is recorded as a preset value, and the other pages are recorded as zero. Next, a Logic AND calculation is performed for the pages in the first register and the pages in the second register, and then the result is recorded in the second register, thus, the corresponding page stored with data can be taken out from the first register. Then, the other pages sorted in front of the corresponding page stored with data in the first register are moved backwards by one bit group, and meanwhile, the corresponding page stored with data in the second register is changed to the foremost page. Finally, a Logic OR calculation is performed for the pages in the first register and the pages in the second register, and the calculation result is recorded in the first register.

Similarly, in the above Step S240, when the data cannot be found out in the memory block, the last page of the first register also must be changed to the foremost page, and the method is similar to that of Step S230, with the only difference lying in that the page taken out is the last page of the first register. First, the second register is used to record a plurality of pages, wherein the last page is recorded as a preset value, and the other pages are recorded as zero. The following steps are the same as those mentioned in Step S230, which thus will not be described herein.

In order to make the method for memory page management of the above embodiment more comprehensible and clear, a second embodiment is illustrated.

Second Embodiment

Figure 3:
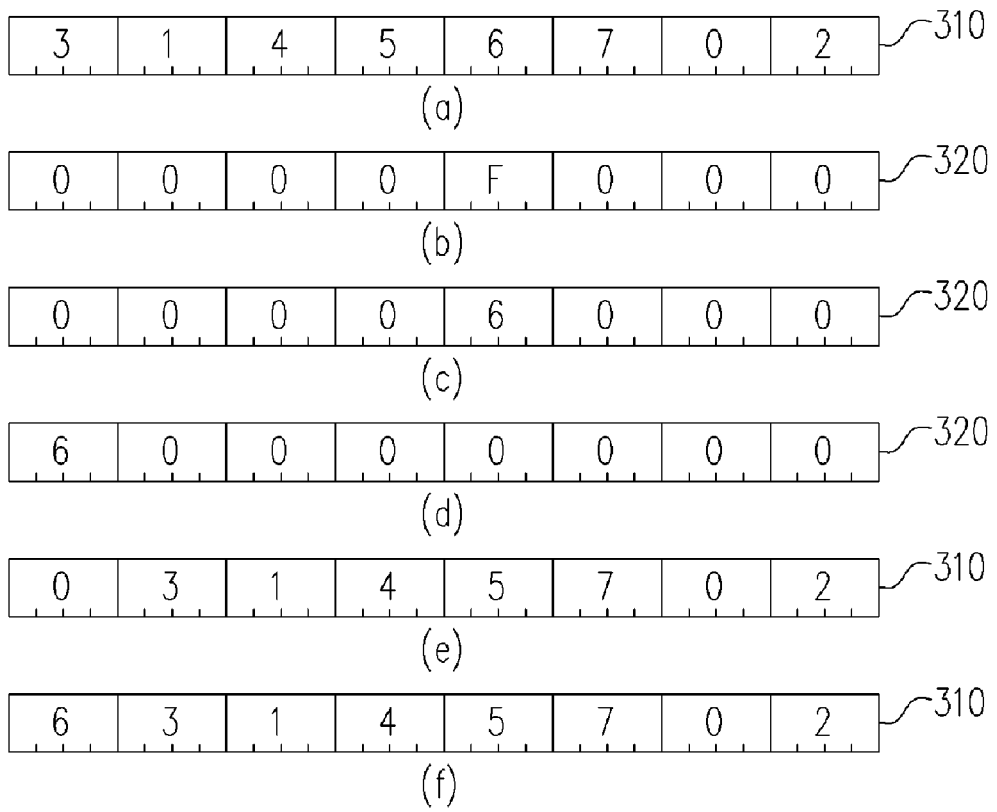
FIG. 3 is a schematic view of the page replacement according to the second embodiment of the present invention.

FIG. 3 is a schematic view of the page replacement according to a second embodiment of the present invention. Referring to FIG. 3, in the embodiment, a 32-bit first register and a 32-bit second register are used to store the pages, wherein each of the pages is recorded by a bit group consisting of 4 bits. However, in other embodiments, the bit group can be 8-bit, 16-bit, or consisted of other numbers of bits, which is not limited in this embodiment. It should be noted that, in the embodiment, the address of each page in the first register has a height order; the foremost page (i.e., the leftmost page in FIG. 3) indicates that its corresponding memory block is the recently accessed one; and the last page (i.e., the rightmost page in FIG. 3) indicates that its corresponding memory block is the least accessed one.

As shown in FIG. 3(a), each page in the first register 310 corresponds to each memory block of the memory respectively. Supposing that the required data is recorded in the memory block corresponding to the 6th page of the first register 310, when the data is read, the existing time of each page of the first register must be changed, that is, the 6th page is updated as the recently accessed page. The operation of page updating includes taking out the corresponding page from the first register, changing it to the foremost page of the first register, and moving all the pages sorted in front of the page backwards by one bit group, thus maintaining the page recorded by the foremost bit group of the first register as the recently accessed page.

The specific method for page updating comprises the following steps. First, a second register is used to record a plurality of pages, and the corresponding page stored with data is recorded as a preset value, and the other pages are recorded as zero. As shown in FIG. 3(b), the page in the second register 320 corresponding to the 5th bit group of the first register 310 is recorded as "F", and the other pages are recorded as "0".

Next, a Logic AND calculation is performed for the first register 310 and the second register 320, and the calculation result is stored back to the second register 320. As shown in FIG. 3(c), the 6th page in the first register 310 has been taken out by the second register 320.

Then, the page in the second register 320 corresponding to the memory block is changed as the foremost page (as shown in FIG. 3(d)), and each of the pages in front of the 6th page in the first register 310 is moved backwards by one bit group (as shown in FIG. 3(e)). The bit group originally used for recording the 6th page is updated as the 5th page, and the foremost page is updated from the 3rd page to 0.

Finally, a Logic OR calculation is performed for the each page of the first register 310 and the second register 320, thus the latest page information is obtained (as shown in FIG. 3(f)), and then the calculation result is stored back to the first register 310, thus finishing the page replacement of the present invention.

Third Embodiment

It is supposed that the required data cannot be found out in the memory block in the third embodiment of the present invention, at this time, the least recently used page in the first register must be found out, and then the required data accessed from an external storage device is stored in the memory block corresponding to the page. Likewise, the LRU paging rule is used in this embodiment, therefore, the least recently used page in the first register is the page recorded by the last bit group of the first register.

Figure 4:
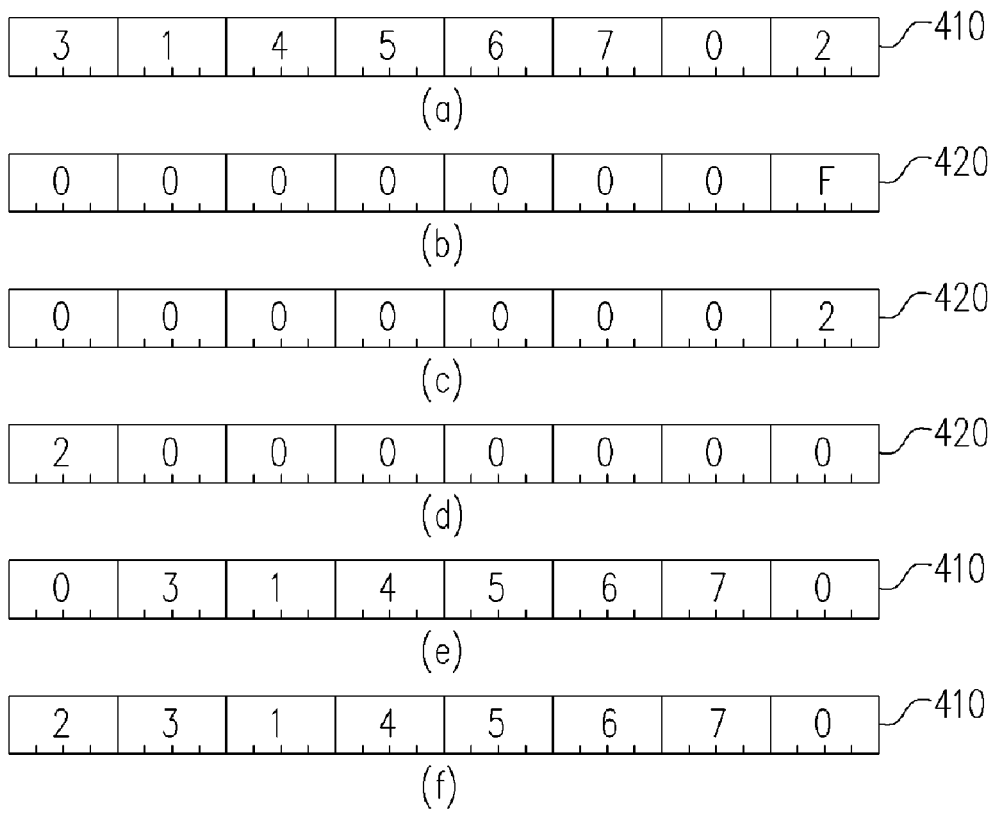
FIG. 4 is a schematic view of the page replacement according to the third embodiment of the present invention.

FIG. 4 is a schematic view of the page replacement according to a third embodiment of the present invention. Referring to FIG. 4(a), each page in the first register 410 corresponds to a memory block of the memory, when the required data cannot be found out in the memory block, the last page of the first register must be taken as the page for storing the data; and it is taken out from the first register to be changed to the foremost page of the first register, while all the pages sorted in front of it are moved backwards by one bit group, thus maintaining the page recorded by the foremost bit group of the first register as the recently accessed page.

The specific method of page updating comprises the following steps. First, a second register is used to record a plurality of pages, and the last page is set as a preset value, while the other pages are preset as zero. As shown in FIG. 4(b), the page of the last bit group in the second register 420 is recorded as "F", and the other pages are recorded as "0".

Then, a Logic AND calculation is preformed for the first register 410 and the second register 420, and then the calculation result is stored to the second register 420. As shown in FIG. 4(c), the 2nd page of the first register 410 has already been taken out by the second register 420.

Next, the last page of the second register 420 is changed to the foremost page (as shown in FIG. 4(*d*)), and each page in the first register is moved backwards by one bit group (as shown in FIG. 4(*e*)). Thus, the bit group originally used for recording the 2nd page is updated as the 0th page, and the foremost page is updated from the 3rd page to 0.

Finally, a Logic OR calculation is performed for each of the pages in the first register 410 and the second register 420, thus the latest page information is obtained, and then the calculation result is stored back to the first register 410 (as shown in FIG. 4(*f*)), thus finishing the page replacement of the present invention.

It is notable that, in this embodiment, since the required data is not stored in the memory block, when the page to be updated is determined, the required data must be accessed from the external storage device and then stored in the memory block corresponding to the page for being used by the microprocessor.

Compared the present invention with the conventional paging method (with reference to the prior art of the present invention), the present invention only needs two 32-bit registers without requiring additional memory space as the page counter; and during the process of page replacement, only one-time memory reading, one-time memory writing, two logic calculations and two shift calculations are needed. Therefore, compared with the conventional art, the present invention saves the memory space and significantly reduces the frequency of performing memory reading/writing and logic calculations by the microprocessor.

It is notable that, when the number of the above recorded pages exceeds the allowable number of pages stored in the first register (totally 8 pages are included in the embodiment), a plurality of registers can be used to record the pages. The specific method of page replacement of the present invention is illustrated by taking the following circumstance of using two registers to record the pages as an example.

Fourth Embodiment

The present invention utilizes two 32-bit registers (i.e., a first register and a second register) to record a plurality of pages, wherein each register is divided into 8 bit groups, and each group includes 4 bits. The pages are recorded from the foremost page of the first register to the last page of the second register according to the accessing sequence of the data in the memory blocks.

It is supposed that the required data is found out in the memory block in this embodiment, thus the page replacement can be achieved only by changing the page corresponding to the data to the foremost page of the first register, and the specific steps are described as follows.

Figure 5:
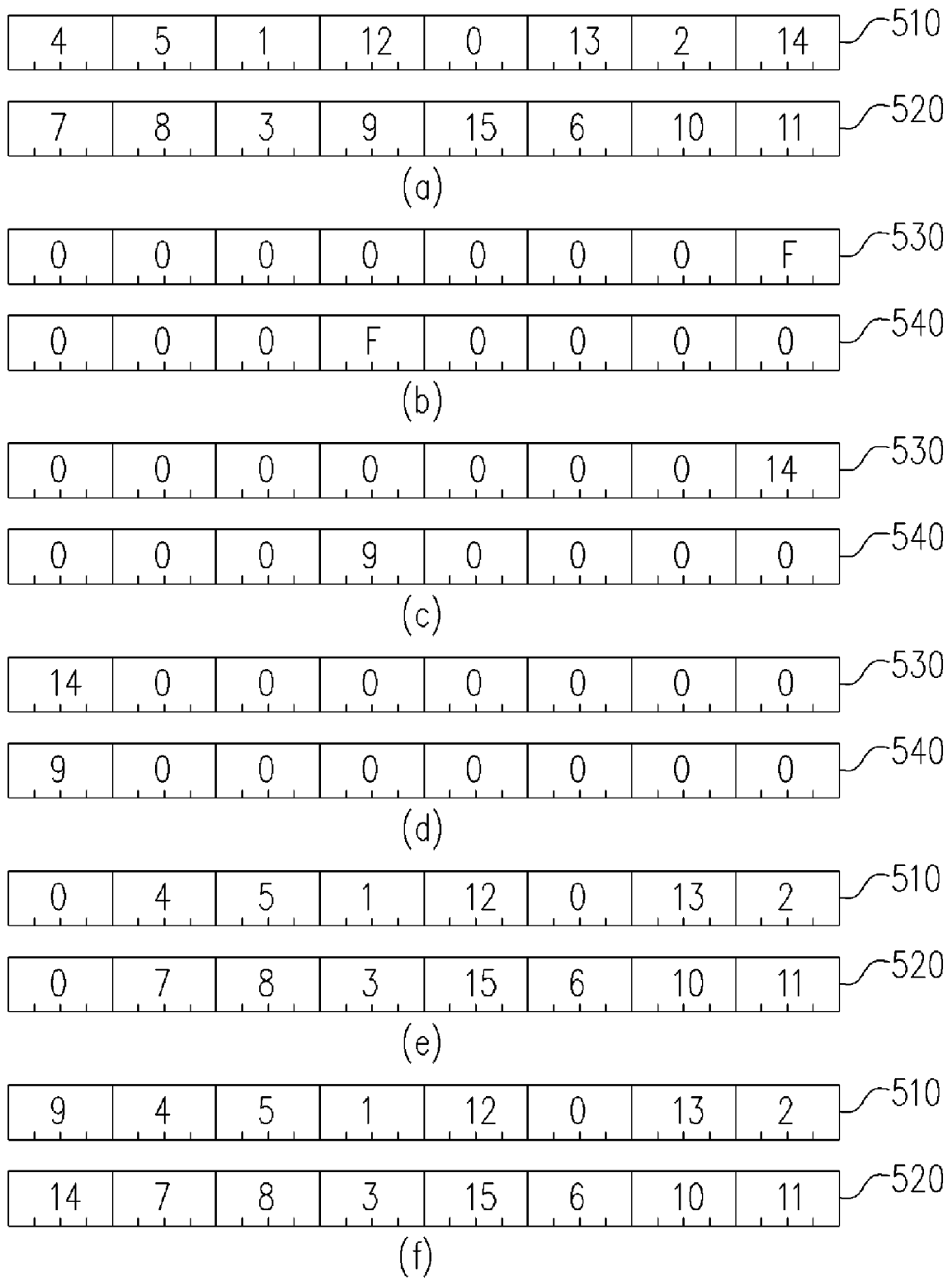
FIG. 5 is a schematic view of the page replacement according to the fourth embodiment of the present invention.

FIG. 5 is a schematic view of the page replacement according to the fourth embodiment of the present invention. Referring to FIG. 5, it is supposed in this embodiment that the page corresponding to the memory block stored with the data is the 9th page, as shown in FIG. 5(*a*), and the 9th page is located in the 4th bit group of the second register 510, thus the page is taken out from the bit group and then changed to the foremost page of the first register.

First, a third register 530 and a fourth register 540 are used. As shown in FIG. 5(*b*), the last page of the third register 530 is set as "F", the 9th page in the fourth register corresponding to the second register 520 is set as "F", and the other pages in the third and fourth registers are set as "0".

Then, a Logic AND calculation is preformed for each of the pages of the first register 510 and the third register 530, so as to take out the last page of the first register. As shown in FIG. 5(*c*), the last page of the third register 530 is recorded as the 14th page, and the other pages are recorded as zero. Moreover, a Logic AND calculation is also preformed for the second register 520 and the fourth register 540, and then the calculation result is stored back to the fourth register 540. As shown in FIG. 5(*c*), the 4th bit group in the fourth register 540 is recorded as the 9th page, and the other pages are recorded as zero.

Next, the page recorded by the third register 530 and the fourth register 540 are changed to the foremost page respectively (as shown in FIG. 5(*d*)). Then, each of the pages in the first register 510 is moved backwards by one bit group, and meanwhile, each of the pages in front of the 9th page in the second register 520 is also moved backwards by one bit group (as shown in FIG. 5(*e*)).

Finally, a Logic OR calculation is performed for the first register 510 and the fourth register 540, and meanwhile, the same calculation is also performed for the second register 520 and the third register 530, thus, the latest page information is obtained, and then the calculation result is stored back to the first register 510 and the second register 520, thus finishing the page replacement of the present invention (as shown in FIG. 5(*f*)).

Fifth Embodiment

If the required data cannot be found out in the memory blocks corresponding to the pages of the first or second registers, the last page of the second register must be used to record the data accessed from the external storage device, and also, the page must be replaced to the foremost page of the first register, thus maintaining the page recorded by the foremost bit group of the first register as the recently accessed page.

Figure 6:
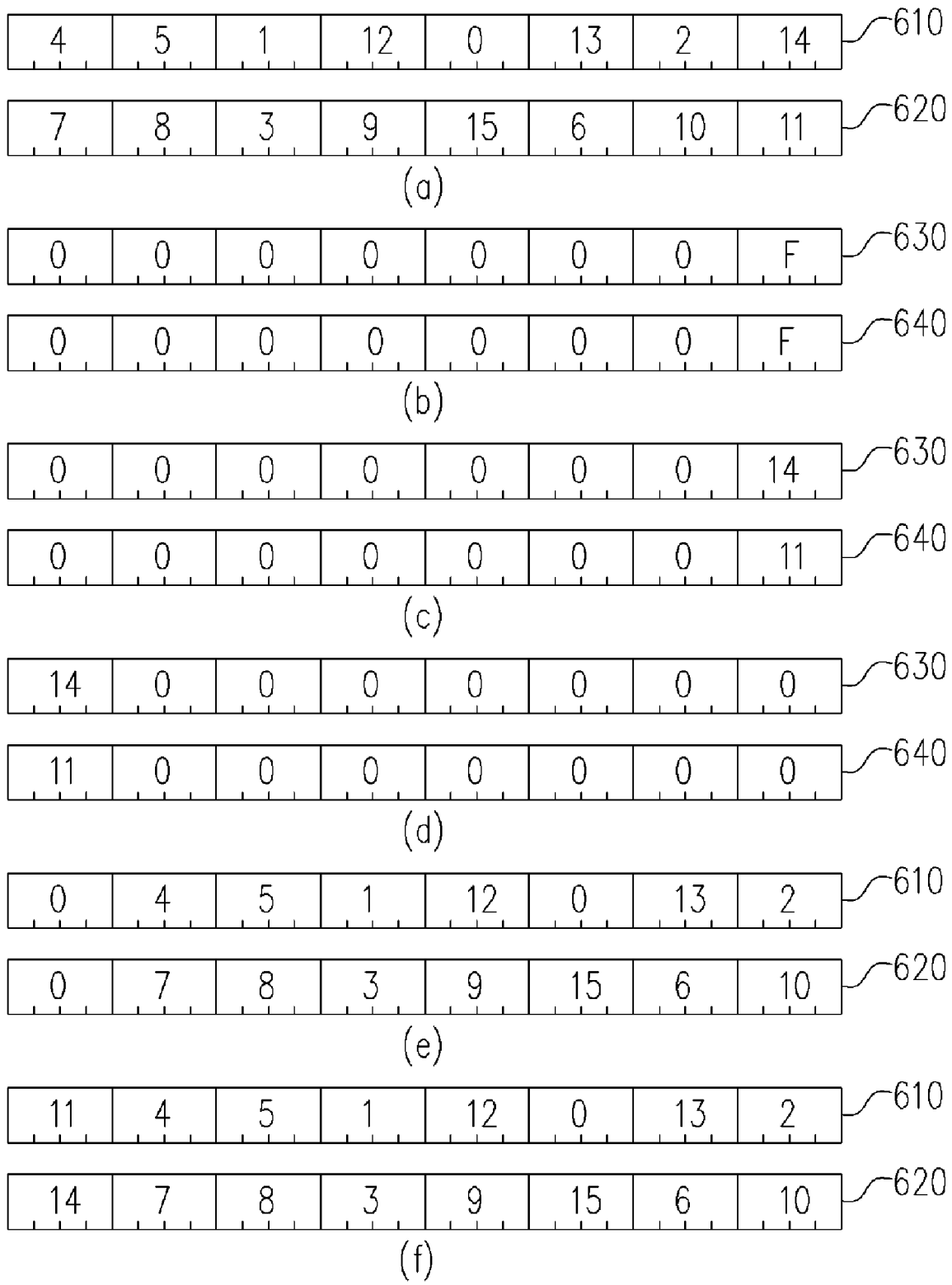
FIG. 6 is a schematic view of the page replacement according to the fifth embodiment of the present invention.

FIG. 6 is a schematic view of the page replacement according to the fifth embodiment of the present invention. Referring to FIG. 6(*a*), it is supposed in this embodiment that the required data is not recorded in the memory blocks corresponding to the pages of the first register 610 and the second register 620, therefore the last page of the second register 620 (i.e., the 11th page) is taken as the page to be updated, and also, the required data accessed from the external storage device is stored in the memory block corresponding to the page for being used by the microprocessor.

Similar to the fourth embodiment, this embodiment also uses a third register 630 and a fourth register 640. As shown in FIG. 5(*b*), the page of the last bit group of the third register 630 is recorded as "F", the page of the last bit group of the fourth register is recorded as "F", and the other pages in the third and fourth registers are all set as "0".

Then, a Logic AND calculation is performed for each of the pages of the first register 610 and the third register 630, so as to take out the last page of the first register. As shown in FIG. 6(*c*), the last page of the third register 630 is recorded as the 14th page, and the other pages are recorded as zero. Moreover, a Logic AND calculation is also performed for the second register 620 and the fourth register 640, and the calculation result is stored back to the fourth register 640. As shown in FIG. 6(*c*), the last page of the fourth register 640 is recorded as the 11th page, and the other pages are recorded as zero.

Next, the pages recorded in the third register 630 and in the fourth register 640 are changed to the foremost page respectively (as shown in FIG. 6(*d*)). Then, each page of the first register 610 is moved backwards by one bit group, and meanwhile each page of the second register 620 is also moved backwards by one bit group (as shown in FIG. 6(*e*)).

Finally, a Logic OR calculation is performed for the first register 610 and the fourth register 640, and meanwhile, the same calculation is performed for the second register 620 and the third register 630, thus the latest page information is obtained, and then the calculation result is stored back to the first register 610 and the second register 620, thus finishing the page replacement of the present invention (as shown in FIG. 6(*f*)).

To sum up, in the method for memory page management of the present invention, the sequence of the existing time for a plurality of pages in the memory is changed by moving bit groups, which functions as the reference for page replacement, thus, the method has the following advantages:

1. The present invention does not require counters to record the existing time of each page, thus saving the memory space.

2. The pages are recorded according to the accessing sequence of the data in each memory block, such that the recently accessed page or the least recently accessed page can be found out rapidly, thus reducing the time for searching the pages.

3. The frequency for performing memory reading/writing and logic calculations is relatively lower, thus reducing the time required for calculation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for memory page management, suitable for managing data in a plurality of memory blocks of a memory, comprising:
   a. recording a plurality of pages in a first register, wherein the pages are recorded in the first register according to the accessing sequence of the data in the memory blocks;
   b. when a request for reading data is received, determining whether the data is stored in the memory blocks;
   b1. if the data is stored in the memory blocks, finding out the corresponding page and changing the corresponding page stored with data in the first register to the foremost page of the first register, wherein the step of changing the corresponding page stored with data in the first register to the foremost page of the first register further comprises:
      b11. recording a plurality of pages in a second register, wherein the corresponding page stored with data in the second register is recorded as a preset value, and other pages are recorded as zero;
      b12. performing a logic AND calculation for the pages in the first register and the pages in the second register, and recording the result in the second register;
      b13. moving other pages sorted in front of the page in the first register backwards by one bit group; and
      b14. changing the corresponding page stored with data in the second register to the foremost page;
      b15. performing a logic OR calculation for the pages in the first register and the pages in the second register; and
      b16. recording the calculation result in the first register;
   b2. if the data is not stored in the memory blocks, taking the last page of the first register as the page for storing the data, and storing the data accessed from an external storage device to the memory block corresponding to the page; and
   c. outputting the data read from the memory block corresponding to the page.

2. The method for memory page management as claimed in claim 1, wherein the pages are recorded by a plurality of bit groups in the first register.

3. The method for memory page management as claimed in claim 2, wherein each of the bit groups comprises a plurality of bits.

4. The method for memory page management as claimed in claim 2, wherein the step b2 further comprises:
   changing the last page in the first register to the foremost page of the register.

5. The method for memory page management as claimed in claim 4, wherein the step of changing the last page in the first register to the foremost page of the register comprises:
   taking out the page;
   moving other pages sorted in front of the page in the first register backwards by one bit group; and
   recording the page as the foremost page of the first register.

6. The method for memory page management as claimed in claim 5, wherein the step of taking out the page comprises:
   recording a plurality of pages in a second register, wherein the last page of the second register is recorded as a preset value, and other pages are recorded as zero; and
   performing a logic calculation for the plurality of pages in the first register and the plurality of pages in the second register, and then recording the result in the second register.

7. The method for memory page management as claimed in claim 6, wherein the logic calculation is a Logic AND calculation.

8. The method for memory page management as claimed in claim 6, wherein the step of recording the page as the foremost page of the first register comprises:
   changing the last page of the second register to the foremost page;
   performing a logic calculation for the pages in the first register and the pages in the second register; and
   recording the calculation result in the first register.

9. The method for memory page management as claimed in claim 8, wherein the logic calculation is a Logic OR calculation.

10. The method for memory page management as claimed in claim 1, wherein when the number of the recorded pages exceeds the allowable number of pages stored in the first register further comprises using at least a third register to record the pages.

\* \* \* \* \*